US009189487B2

(12) United States Patent
Yu et al.

(10) Patent No.: US 9,189,487 B2
(45) Date of Patent: Nov. 17, 2015

(54) METHOD FOR RECORDING TRANSACTION LOG, AND DATABASE ENGINE

(71) Applicant: Huawei Technologies Co., Ltd., Shenzhen (CN)

(72) Inventors: Wei Yu, Beijing (CN); Huijun Liu, Beijing (CN); Yuanyuan Nie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/721,600

(22) Filed: May 26, 2015

(65) Prior Publication Data
US 2015/0254264 A1 Sep. 10, 2015

Related U.S. Application Data (63) Continuation of application No. PCT/CN2014/081106, filed on Jun. 30, 2014.

(30) Foreign Application Priority Data

Dec. 30, 2013 (CN) .......................... 2013 1 0744292

(51) Int. Cl.
G06F 17/30 (2006.01)
G06F 11/14 (2006.01)
(52) U.S. Cl.
CPC ...... *G06F 17/30097* (2013.01); *G06F 11/1469* (2013.01); *G06F 17/30* (2013.01); *G06F 17/30109* (2013.01); *G06F 17/30368* (2013.01); *G06F 17/30371* (2013.01); *G06F 17/30575* (2013.01); *G06F 2201/80* (2013.01)
(58) Field of Classification Search
None
See application file for complete search history.

(56) References Cited

U.S. PATENT DOCUMENTS 5,043,866 A * 8/1991 Myre et al.
5,170,480 A 12/1992 Mohan et al.
(Continued)

FOREIGN PATENT DOCUMENTS

CN 103092903 A 5/2013
CN 103729442 A 4/2014

OTHER PUBLICATIONS

Partial English Translation and Abstract of Chinese Patent Application No. CN103729442A, Apr. 29, 2015, 3 pages.
(Continued)

*Primary Examiner* — Neveen Abel Jalil
*Assistant Examiner* — Eddy Cheung
(74) *Attorney, Agent, or Firm* — Conley Rose, P.C.; Grant Rodolph; Nicholas K. Beaulieu (57) ABSTRACT

A method for recording a transaction log, and a database engine, and pertains to the field of database technologies. The method includes receiving an structured query language (SQL) request; modifying, according to the SQL request, a data page corresponding to the SQL request; generating a corresponding transaction log for the modifying; partitioning the transaction log to obtain a plurality of log segments; and writing the plurality of log segments into a plurality of log buffers, and writing the log segments in the plurality of log buffers into a log file in parallel. According to the present invention, not only lock granularities of the log buffers of the transaction log are reduced, but also a speed at which a log file is written into a magnetic disk is greatly increased, thereby improving performance of a database system and enhancing user experience.

10 Claims, 8 Drawing Sheets

(56) References Cited

U.S. PATENT DOCUMENTS

| | | | |
|---|---|---|---|
| 5,499,367 A * | 3/1996 | Bamford et al. | |
| 5,870,743 A | 2/1999 | Cohen et al. | |
| 7,249,150 B1 * | 7/2007 | Watanabe et al. | |
| 2002/0112094 A1 * | 8/2002 | Pederson et al. | 709/330 |
| 2002/0178177 A1 | 11/2002 | Park et al. | |
| 2003/0061537 A1 * | 3/2003 | Cha et al. | 714/16 |
| 2004/0215883 A1 * | 10/2004 | Bamford | G06F 17/3048 711/129 |
| 2006/0101033 A1 * | 5/2006 | Hu | G06F 11/1471 |
| 2007/0083574 A1 | 4/2007 | Garin et al. | |
| 2010/0088517 A1 * | 4/2010 | Piersol | H04L 9/3236 713/171 |
| 2013/0073532 A1 | 3/2013 | Bachar et al. | |
| 2013/0117234 A1 * | 5/2013 | Schreter | 707/674 |
| 2014/0279917 A1 * | 9/2014 | Minh et al. | 707/648 |
| 2014/0279920 A1 * | 9/2014 | Madhavarapu et al. | 707/649 |
| 2014/0279929 A1 * | 9/2014 | Gupta et al. | 707/683 |

OTHER PUBLICATIONS

Foreign Communication From a Counterpart Application, PCT Application No. PCT/CN2014/081106, English Translation of International Search Report dated Sep. 26, 2014, 2 pages.

Foreign Communication From a Counterpart Application, PCT Application No. PCT/CN2014/081106, Written Opinion dated Sep. 26, 2014, 5 pages.

* cited by examiner

| Redo Log 1 |
|---|
| Tran File Block Pos Value |
| T0 Storage – file create: 23 |
| T4 Storage – file delete: 24 |

| Redo Log 2 | | | | |
|---|---|---|---|---|
| Tran | File | Block | Pos | Value |
| T0 Storage – file create: | | | | |
| Base/12562/16385 | | | | |
| T1 | 3 | 12 | 41 | 5 |
| T1 | 3 | 12 | 38 | 10 |
| T2 | 3 | 12 | 123 | 4 |
| T2 | 3 | 12 | 57 | 7 |
| T2 | 3 | 12 | 88 | 9 |
| T4 | 3 | 12 | 123 | 4 |
| T4 | 3 | 12 | 88 | 9 |
| T4 | commit SCN# time stamp | | | |

| Redo Log 3 | | | | |
|---|---|---|---|---|
| Tran | File | Block | Pos | Value |
| T0 Storage – file create: | | | | |
| Base/12562/16385 | | | | |
| T1 | 3 | 13 | 25 | 5 |
| T1 | 3 | 13 | 46 | 8 |
| T1 | commit SCN# time stamp | | | |
| T3 | 2 | 13 | 123 | 4 |
| T3 | 2 | 13 | 99 | 67 |
| T3 | 2 | 13 | 88 | 9 |
| T2 | commit SCN# time stamp | | | |
| T3 | commit SCN# time stamp | | | |

METHOD FOR RECORDING TRANSACTION LOG, AND DATABASE ENGINE

CROSS-REFERENCE TO RELATED APPLICATION

This application is a continuation of International Application No. PCT/CN2014/081106, filed on Jun. 30, 2014, which claims priority to Chinese Patent Application No. 201310744292.5, filed on Dec. 30, 2013, both of which are hereby incorporated by reference in their entireties.

TECHNICAL FIELD

The present invention relates to the field of database technologies, and in particular, to a method for recording a transaction log, and a database engine.

BACKGROUND

A transaction log of a database is a file that is used to record each modification action of the database. The transaction log is a basis for undoing a transaction, and restoring the transaction when a fault occurs. A difference from a common system log lies in that, when a transaction log of a database records a change of a database system, sequence consistency needs to be ensured, and when a fault is rectified, a restoration also needs to be performed completely according to a sequence in which a transaction occurs. Generally, to reduce input and output, a database system records a transaction log using a write-ahead logging (WAL) mechanism. The WAL indicates that modifications must be made to a data file after the transaction log has recorded these modifications, that is, after a log record that describes these modifications is written into a magnetic disk.

When a fault occurs in a database system, a process in which the system is restored to a previous consistent state using a transaction log is called a database restoration. Using a redo log, a modification that has been made to the system may be made again to avoid a data loss. Using an undo log, a modification that is not successfully submitted when a fault occurs may be undone, thereby ensuring consistency of a database.

Currently, a transaction log of a database is recorded in a serial mode, and the transaction log is saved using a single log buffer and a single log file. However, the serial mode causes that the transaction log is written into a magnetic disk very slowly, and a case in which a resource is locked when one request is responded to and another request must wait for unlocking of the resource may occur in the single log buffer. Therefore, lock granularity is enlarged, which causes lower availability of the database system and poor user experience.

SUMMARY

The present invention provides a method for recording a transaction log, and a database engine, so as to improve performance of a database system and enhance user experience.

Technical Solutions are as Follows:

According to a first aspect, a method for recording a transaction log is provided, where the method includes receiving a structured query language (SQL) request; modifying, according to the SQL request, a data page corresponding to the SQL request; generating a corresponding transaction log for the modifying; partitioning the transaction log to obtain a plurality of log segments; and writing the plurality of log segments into a plurality of log buffers, and writing the log segments in the plurality of log buffers into a log file in parallel.

With reference to the first aspect, in a first implementation manner, the partitioning the transaction log to obtain a plurality of log segments; and writing the plurality of log segments into a plurality of log buffers, and writing the log segments in the plurality of log buffers into a log file in parallel includes determining a type of the transaction log; if the type of the transaction log is a parallel execution log, partitioning the transaction log to obtain the plurality of log segments, and writing the plurality of log segments into a plurality of parallel execution log buffers; and writing the log segments in the plurality of log buffers into a plurality of parallel execution log files in parallel; where the parallel execution log refers to a transaction log that is generated when the modifying is modifying during which a sequence does not need to be ensured.

With reference to the first implementation manner, in a second implementation manner, after the determining a type of the transaction log, the method further includes, if the type of the transaction log is a preferential execution log, writing the transaction log into a preferential execution log buffer; and writing the transaction log in the preferential execution log buffer into a preferential execution log file; where the preferential execution log refers to a transaction log that is generated when the modifying is modifying during which a sequence needs to be ensured.

With reference to the first implementation manner, in a third implementation manner, the partitioning the transaction log to obtain the plurality of log segments, and writing the plurality of log segments into a plurality of parallel execution log buffers includes determining, according to a file number, a page number, and a position on a page of each record in the transaction log and according to a preset rule, a parallel execution log buffer corresponding to each record; and writing each record into the corresponding log buffer in parallel; where the preset rule is that records related to a same data page correspond to a same parallel execution log buffer.

With reference to the third implementation manner, in a fourth implementation manner, the determining, according to a file number, a page number, and a position on a page of each record in the transaction log and according to a preset rule, a parallel execution log buffer corresponding to each record includes obtaining a hash value of each record in the transaction log by means of calculating according to the file number, the page number, and the position on the page of each record in the transaction log, and performing searching, in a set correspondence between a hash value and a parallel execution log buffer, to obtain a parallel execution log buffer corresponding to the hash value of each record in the transaction log.

With reference to the second implementation manner, in a fifth implementation manner, the method further includes, when a fault is rectified, first executing a restoration operation according to the preferential execution log file; and then executing restoration operations in parallel according to the plurality of parallel execution log files.

With reference to the first implementation manner, in a sixth implementation manner, the determining a type of the transaction log includes determining, according to the transaction log, whether the modifying is modifying during which a sequence needs to be ensured; if the modifying is modifying during which a sequence needs to be ensured, determining that the type of the transaction log is a preferential execution log; and if the modifying is modifying during which a sequence does not need to be ensured, determining that the type of the transaction log is a parallel execution log.

According to a second aspect, a database engine is provided, where the database engine includes a receiving module configured to receive a SQL request; a modifying module configured to modify, according to the SQL request, a data page corresponding to the SQL request; a generating module configured to generate a corresponding transaction log for the modifying; and a writing module configured to partition the transaction log to obtain a plurality of log segments, write the plurality of log segments into a plurality of log buffers, and write the log segments in the plurality of log buffers into a log file in parallel.

With reference to the second aspect, in a first implementation manner, the database engine further includes a determining module configured to determine a type of the transaction log; and the writing module includes a log buffer writing unit configured to, if the determining module determines that the type of the transaction log is a parallel execution log, partition the transaction log to obtain the plurality of log segments, and write the plurality of log segments into a plurality of parallel execution log buffers; and a file writing unit configured to write the log segments in the plurality of log buffers into a plurality of parallel execution log files in parallel; where the parallel execution log refers to a transaction log that is generated when the modifying is modifying during which a sequence does not need to be ensured.

With reference to the first implementation manner of the second aspect, in a second implementation manner, the log buffer writing unit is further configured to, if the determining module determines that the type of the transaction log is a preferential execution log, write the transaction log into a preferential execution log buffer; and the file writing unit is further configured to write the transaction log in the preferential execution log buffer into a preferential execution log file; where the preferential execution log refers to a transaction log that is generated when the modifying is modifying during which a sequence needs to be ensured.

With reference to the first implementation manner of the second aspect, in a third implementation manner, the log buffer writing unit includes a determining subunit configured to determine, according to a file number, a page number, and a position on a page of each record in the transaction log and according to a preset rule, a parallel execution log buffer corresponding to each record; and a log buffer writing subunit configured to write each record into the corresponding log buffer in parallel; where the preset rule is that records related to a same data page correspond to a same parallel execution log buffer.

With reference to the third implementation manner of the second aspect, in a fourth implementation manner, the determining subunit is configured to obtain a hash value of each record in the transaction log by means of calculating according to the file number, the page number, and the position on the page of each record in the transaction log, and perform searching, in a set correspondence between a hash value and a parallel execution log buffer, to obtain a parallel execution log buffer corresponding to the hash value of each record in the transaction log.

With reference to the second implementation manner of the second aspect, in a fifth implementation manner, the database engine further includes a restoring module configured to, when a fault is rectified, first execute a restoration operation according to the preferential execution log file, and then execute restoration operations in parallel according to the plurality of parallel execution log files.

With reference to the first implementation manner of the second aspect, in a sixth implementation manner, the determining module is configured to determine, according to the transaction log, whether the modifying is modifying during which a sequence needs to be ensured; if the modifying is modifying during which a sequence needs to be ensured, determine that the type of the transaction log is a preferential execution log; and if the modifying is modifying during which a sequence does not need to be ensured, determine that the type of the transaction log is a parallel execution log.

The technical solutions provided in the present invention bring the following beneficial effects: An SQL request is received; a data page corresponding to the SQL request is modified according to the SQL request; a corresponding transaction log is generated for the modifying; the transaction log is partitioned to obtain a plurality of log segments; the plurality of log segments is written into a plurality of log buffers; and the log segments in the plurality of log buffers are written into a log file in parallel. In this way, it is implemented that the transaction log is recorded in parallel. There is a plurality of log buffers, and log segments are written into a log file in a parallel processing manner; therefore, parallel execution log buffers enable resources to be locked separately without affecting each other, so that lock granularities of the log buffers of the transaction log are reduced, a speed at which a log file is written into a magnetic disk is greatly increased, thereby improving performance of a database system and enhancing user experience.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1A:
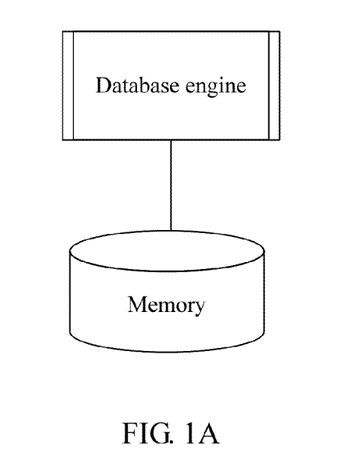
FIG. 1A to FIG. 1C are schematic diagrams of a database system according to an embodiment of the present invention.
Figure 1B:
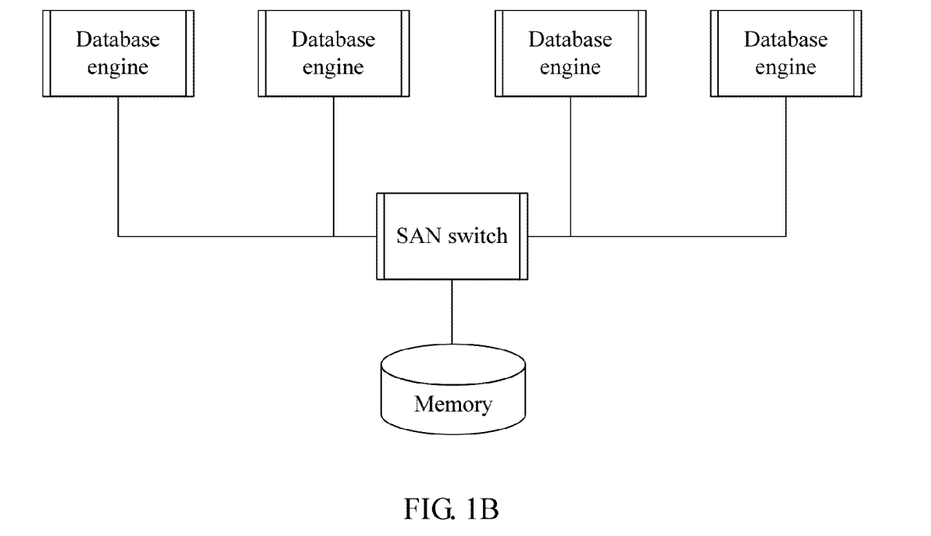
Figure 1C:
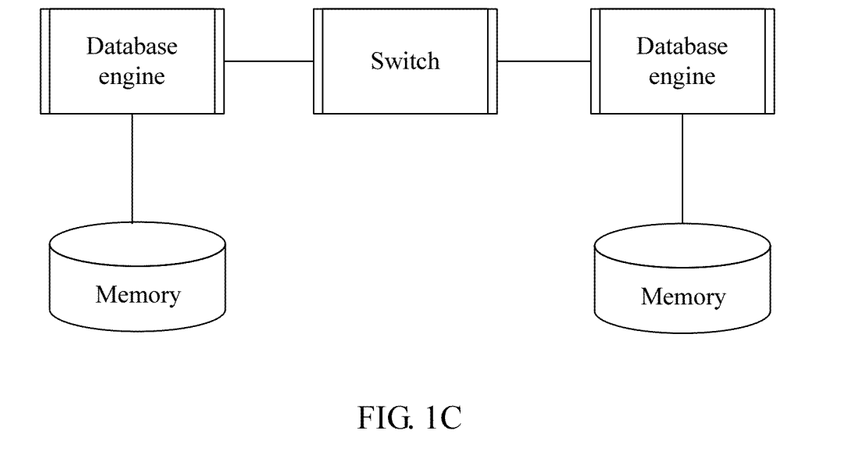

Embodiments of the present invention relate to a method for recording a transaction log, and a database engine, which are used to record a transaction log. The method for recording a transaction log, and the database engine may be applied to a database system, such as single instance, cluster, or dual hot-standby. FIG. 1 is a schematic diagram of an application scenario of the foregoing method and database engine. FIG. 1A is a schematic diagram of a single instance database system, which provides, using a database engine, services such as querying and modifying a database, and stores data into a magnetic disk correspondingly. FIG. 1B is a schematic diagram of a cluster database system, which includes a plurality of database engines that separately provide a user with services, such as querying and modifying a database. The plurality of database engines stores shared data in a magnetic disk, and executes, using a storage area network (SAN) switch, a read/write operation on the data in the magnetic disk. FIG. 1C is a schematic diagram of a dual hot-standby database system, which includes two database engines, one is an active host, and the other is a standby host. The active host and the standby host are connected using a switch, store data into their respective corresponding magnetic disks. In addition, data stored in the active host and the standby host is kept synchronous, so that a restoration is performed according to the standby host when a fault occurs in the active host.

Figure 2:
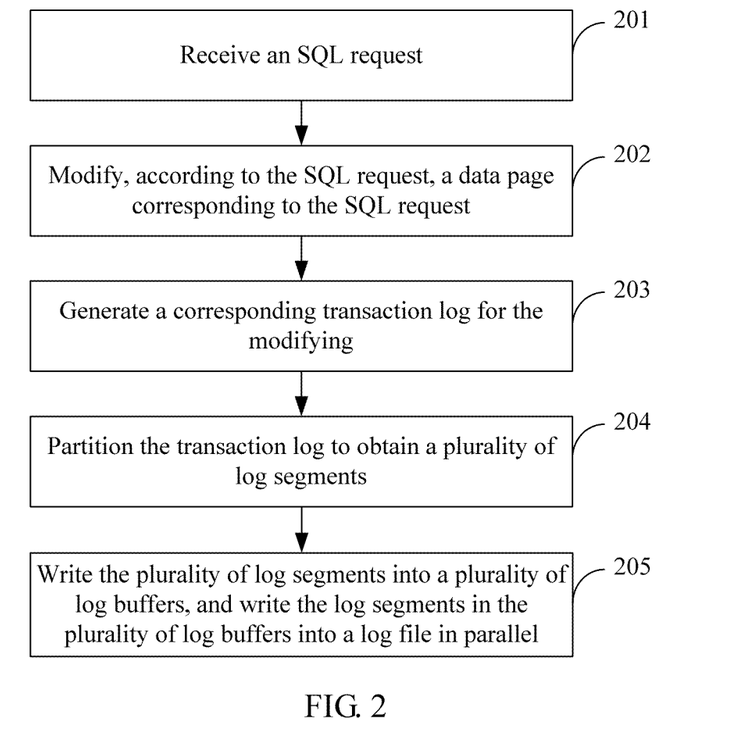
FIG. 2 is a flowchart of a method for recording a transaction log according to an embodiment of the present invention.

Referring to FIG. 2, an embodiment of the present invention provides a method for recording a transaction log, an executor of the method may be a database engine of a database system, and the method includes the following steps:

201. Receive an SQL request.

202. Modify, according to the SQL request, a data page corresponding to the SQL request.

203. Generate a corresponding transaction log for the modifying.

204. Partition the transaction log to obtain a plurality of log segments.

205. Write the plurality of log segments into a plurality of log buffers, and write the log segments in the plurality of log buffers into a log file in parallel.

In this embodiment, there may be one log file or may be a plurality of log files. Generally, there is a plurality of log files. The number of log files may be determined by setting a parameter of degree of parallelism, where the parameter of degree of parallelism may be set as required, which is not limited in this embodiment. When content in a plurality of log buffers is written into a plurality of log files, a relationship between the number of log buffers and the number of log files is not limited in this embodiment, and the number of cache queues and the number of log files may be the same or may be different. In a scenario, the number of log buffers may be set the same as the number of log files, and each log buffer corresponds to one log file; and content in a log buffer is written into a log file corresponding to the log buffer. One or more threads or processes may be enabled to perform log file writing, and the number of threads or processes is not limited in this embodiment, for example, one thread may be enabled for each log buffer, so that content in the log buffer is written into a log file corresponding to the log buffer.

In this embodiment, the partitioning the transaction log to obtain a plurality of log segments; and writing the plurality of log segments into a plurality of log buffers, and writing the log segments in the plurality of log buffers into a log file in parallel may include determining a type of the transaction log; if the type of the transaction log is a parallel execution log, partitioning the transaction log to obtain the plurality of log segments, and writing the plurality of log segments into a plurality of parallel execution log buffers; and writing the log segments in the plurality of log buffers into a plurality of parallel execution log files in parallel; where the parallel execution log refers to a transaction log that is generated when the modifying is modifying during which a sequence does not need to be ensured.

Further, after the determining a type of the transaction log, the method may further include, if the type of the transaction log is a preferential execution log, writing the transaction log into a preferential execution log buffer; and writing the transaction log in the preferential execution log buffer into a preferential execution log file; where the preferential execution log refers to a transaction log that is generated when the modifying is modifying during which a sequence needs to be ensured.

In this embodiment, the determining a type of the transaction log may include determining, according to the transaction log, whether the modifying is modifying during which a sequence needs to be ensured; if the modifying is modifying during which a sequence needs to be ensured, determining that the type of the transaction log is a preferential execution log; and if the modifying is modifying during which a sequence does not need to be ensured, determining that the type of the transaction log is a parallel execution log.

In this embodiment, the transaction log may be classified into two types: a preferential execution log and a parallel execution log. The preferential execution log indicates that modifying that is recorded in the preferential execution log and performed on a data page is modifying during which a sequence needs to be ensured, such as creation of a file; and the parallel execution log indicates that modifying that is recorded in the parallel execution log and performed on a data page is modifying during which a sequence does not need to be ensured, such as submission of a transaction. Generally, there are relatively less database operations corresponding to the preferential execution log, and therefore, one file may be used to store the preferential execution log, and the file may be called a preferential execution log file; while the parallel execution log has much or even a large amount of content, and therefore, a plurality of files may be used to store the parallel execution log, and the files may be called parallel execution log files. When a fault of a database system is rectified, a priority of the preferential execution log file is higher than a priority of the parallel execution log file, that is, a restoration is first performed according to the preferential execution log file, and then restorations are performed according to the parallel execution log files.

In this embodiment, the partitioning the transaction log to obtain the plurality of log segments, and writing the plurality of log segments into a plurality of parallel execution log buffers may include determining, according to a file number, a page number, and a position on a page of each record in the transaction log and according to a preset rule, a parallel execution log buffer corresponding to each record; and writing each record into the corresponding log buffer in parallel; where the preset rule is that records related to a same data page correspond to a same parallel execution log buffer.

In this embodiment, the determining, according to a file number, a page number, and a position on a page of each record in the transaction log and according to a preset rule, a parallel execution log buffer corresponding to each record may include obtaining a hash value of each record in the transaction log by means of calculating according to the file number, the page number, and the position on the page of each record in the transaction log, and performing searching, in a set correspondence between a hash value and a parallel execution log buffer, to obtain a parallel execution log buffer corresponding to the hash value of each record in the transaction log.

In this embodiment, the foregoing method may further include when a fault is rectified, first executing a restoration operation according to the preferential execution log file; and then executing restoration operations in parallel according to the plurality of parallel execution log files.

One thread or process may be first enabled, and a restoration operation is performed by reading the preferential execution log file; and then a plurality of threads or processes is enabled, all parallel execution log files are read at the same time, and restorations are performed in parallel. Records related to a same data page are all in a same log file, and therefore, a relation and a sequence between a plurality of parallel execution logs do not need to be considered when restorations are performed in parallel, thereby greatly increasing a speed and efficiency of restoring a database system.

According to the foregoing method provided in this embodiment, an SQL request is received; a data page corresponding to the SQL request is modified according to the SQL request; a corresponding transaction log is generated for the modifying; the transaction log is partitioned to obtain a plurality of log segments; the plurality of log segments is written into a plurality of log buffers; and the log segments in the plurality of log buffers are written into a log file in parallel. In this way, it is implemented that the transaction log is recorded in parallel. There is a plurality of log buffers, and log segments are written into a log file in a parallel processing manner; therefore, parallel execution log buffers enable resources to be locked separately without affecting each other, so that lock granularities of the log buffers of the transaction log are reduced, a speed at which a log file is written into a magnetic disk is greatly increased, thereby improving performance of a database system and enhancing user experience.

Figure 3:
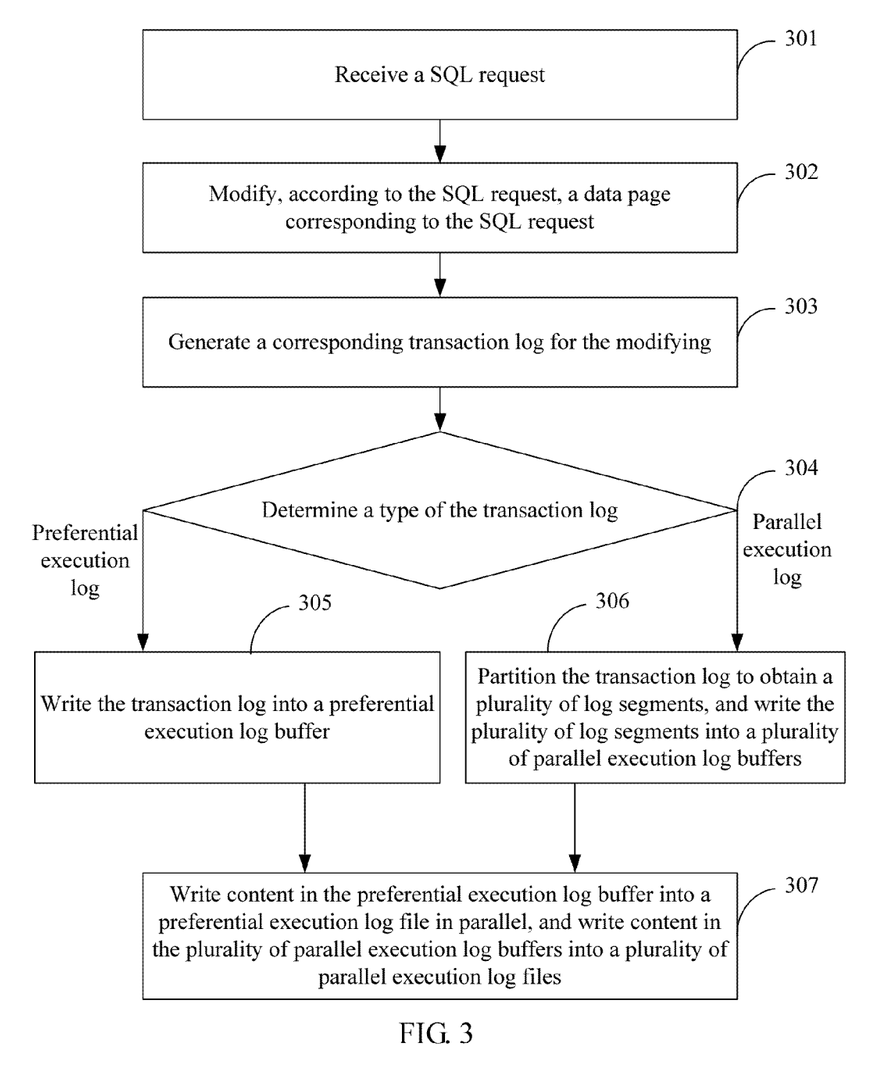
FIG. 3 is a flowchart of another method for recording a transaction log according to an embodiment of the present invention.

Referring to FIG. 3, another embodiment of the present invention further provides a method for recording a transaction log, and the method includes the following steps:

301. Receive a SQL request.

302. Modify, according to the SQL request, a data page corresponding to the SQL request.

303. Generate a corresponding transaction log for the modifying.

304. Determine a type of the transaction log; if the type of the transaction log is a preferential execution log, execute 305; and if the type of the transaction log is a parallel execution log, execute 306.

The determining a type of the transaction log may include determining, according to the transaction log, whether the modifying is modifying during which a sequence needs to be ensured; if the modifying is modifying during which a sequence needs to be ensured, determining that the type of the transaction log is a preferential execution log; and if the modifying is modifying during which a sequence does not need to be ensured, determining that the type of the transaction log is a parallel execution log.

In this embodiment, the transaction log may be classified into two types: a preferential execution log and a parallel execution log. Generally, the preferential execution log may be stored using one file, that is, a preferential execution log file; while the parallel execution log may be stored using a plurality of files, that is, parallel execution log files. For details, reference is made to the description in the foregoing embodiment, which is not described herein again.

305. Write the transaction log into a preferential execution log buffer, and then execute 307.

306. Partition the transaction log to obtain a plurality of log segments, and write the plurality of log segments into a plurality of parallel execution log buffers.

The partitioning the transaction log to obtain a plurality of log segments, and writing the plurality of log segments into a plurality of parallel execution log buffers may include determining, according to a file number, a page number, and a position on a page of each record in the transaction log and according to a preset rule, a parallel execution log buffer corresponding to each record; and writing each record into the corresponding log buffer in parallel, where the preset rule is that records related to a same data page correspond to a same parallel execution log buffer.

Further, the determining, according to a file number, a page number, and a position on a page of each record in the transaction log and according to a preset rule, a parallel execution log buffer corresponding to each record may include obtaining a hash value of each record in the transaction log by means of calculating according to the file number, the page number, and the position on the page of each record in the transaction log, and performing searching, in a set correspondence between a hash value and a parallel execution log buffer, to obtain a parallel execution log buffer corresponding to the hash value of each record in the transaction log.

In this embodiment, each record corresponds to one data page, and information about the data page includes a file number, a page number, and a position on the page. The file number is used to identify a file in which modified data is located; the page number is used to identify a page on which the modified data is located in the file; and the position on the page is used to identify a position at which the modified data is located on the page, and is generally the number of bytes. In this embodiment, a page may also be called a block. Generally, data stored in a database is all stored in the form of a table, and the table is formed by a data page. When the table in the database is read to a memory, the data page may also be called a block. Each data page has a unique number, and the number is a file number and a page number. A data page may be uniquely determined using a data page number, and a position at which data is stored can be found on a data page using a position on the page.

By performing partition using a hash algorithm, a modification log of a same data page can be saved in one log file, and a sequence requirement can be ensured when restorations are performed in parallel. When a process in which a plurality of data pages is restored in parallel is ensured, each data page can be restored according to a transaction modification sequence, so as to meet a sequence requirement of a database restoration.

307. Write content in the preferential execution log buffer into a preferential execution log file, and write content in the plurality of parallel execution log buffers into a plurality of parallel execution log files in parallel.

In this embodiment, there may be one log file or may be a plurality of log files. Generally, there is a plurality of log files. When content in a plurality of log buffers is written into a plurality of log files, a relationship between the number of log buffers and the number of log files is not limited in this embodiment, which may be the same or may be different. One or more threads or processes may be enabled to perform log file writing, and the number of threads or processes is not limited in this embodiment. For details, reference is made to the description in the foregoing embodiment, which is not described herein again.

In this embodiment, the foregoing method may further include, when a fault is rectified, first executing a restoration operation according to the preferential execution log file; and then executing restoration operations in parallel according to the plurality of parallel execution log files.

One thread or process may be first enabled, and a restoration operation is performed by reading the preferential execution log file; and then a plurality of threads or processes is enabled, all parallel execution log files are read at the same time, and restorations are performed in parallel. Records related to a same data page are all in a same log file, and therefore, a relation and a sequence between a plurality of parallel execution logs do not need to be considered when restorations are performed in parallel, thereby greatly increasing a speed and efficiency of restoring a database system.

Figure 4:
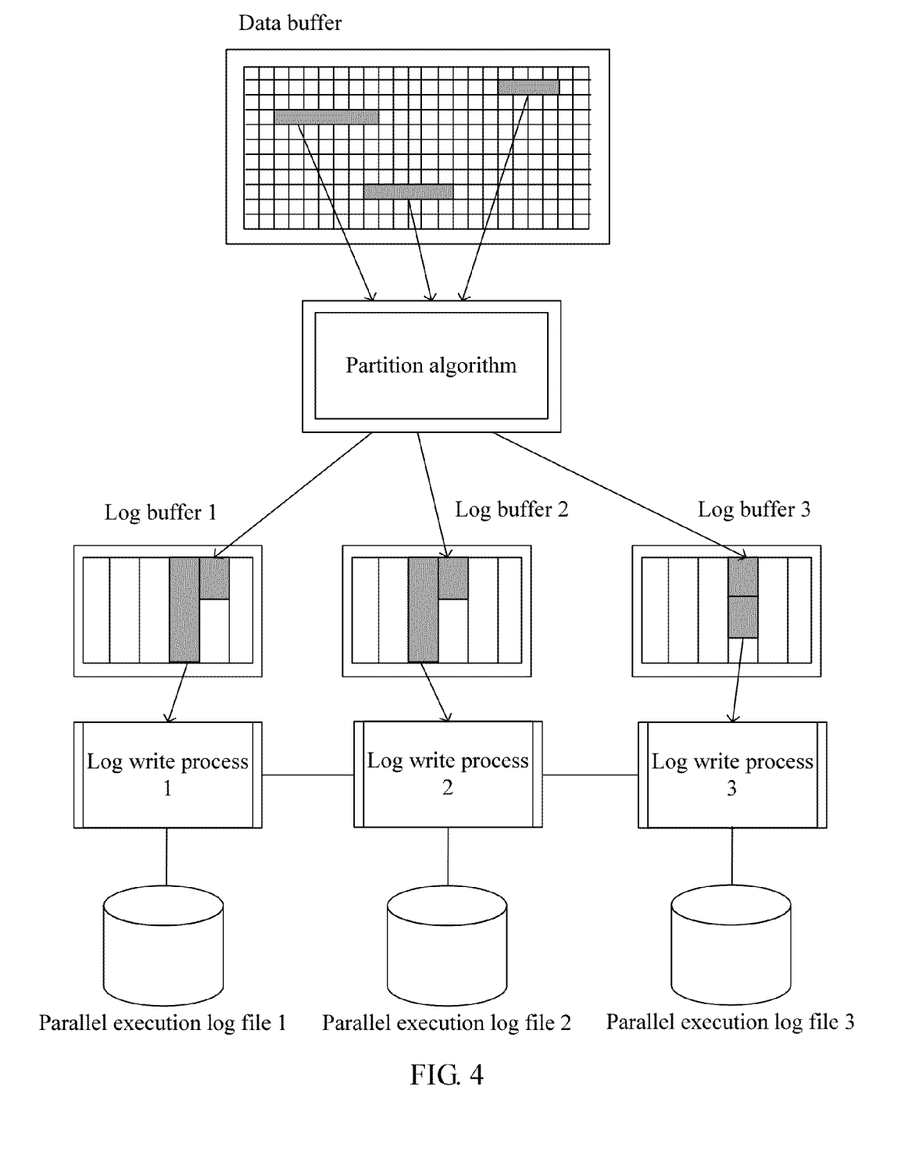
FIG. 4 is a schematic flowchart of still another method for recording a transaction log according to an embodiment of the present invention.

FIG. 4 is a schematic flowchart of a method for recording a transaction log according to an embodiment. A log buffer corresponding to data in a database is shown on the upper part of the figure. When there is data to be modified, the data is first read from a magnetic disk to a log buffer, and is modified in the log buffer, and therefore, dirty data is generated. Three pieces of dirty data are generated in an example as shown in the figure. A transaction log is generated for the modified dirty data. That the transaction log is a parallel execution log is used as an example for description herein. After undergoing an operation using a partition algorithm, the transaction log is partitioned and written into a plurality of parallel execution log buffers in a memory. Three parallel execution log buffers are shown in the example in the figure, that is, a log buffer 1, a log buffer 2, and a log buffer 3. Content in the log buffers is generated transaction logs. Then a plurality of processes may be used to write content in all the log buffers into a magnetic disk in parallel, and parallel execution log files are generated. In the example in the figure, three log writing processes: a Log Write Process 1, a Log Write Process 2, and a Log Write Process 3, are enabled to write logs in parallel, to obtain three parallel execution log files: a Log File 1, a Log File 2, and a Log File 3. In the foregoing process, the transaction logs are written into the log buffers in parallel and written into the log files in parallel, which greatly improves efficiency of performing log file writing.

Figure 5A:
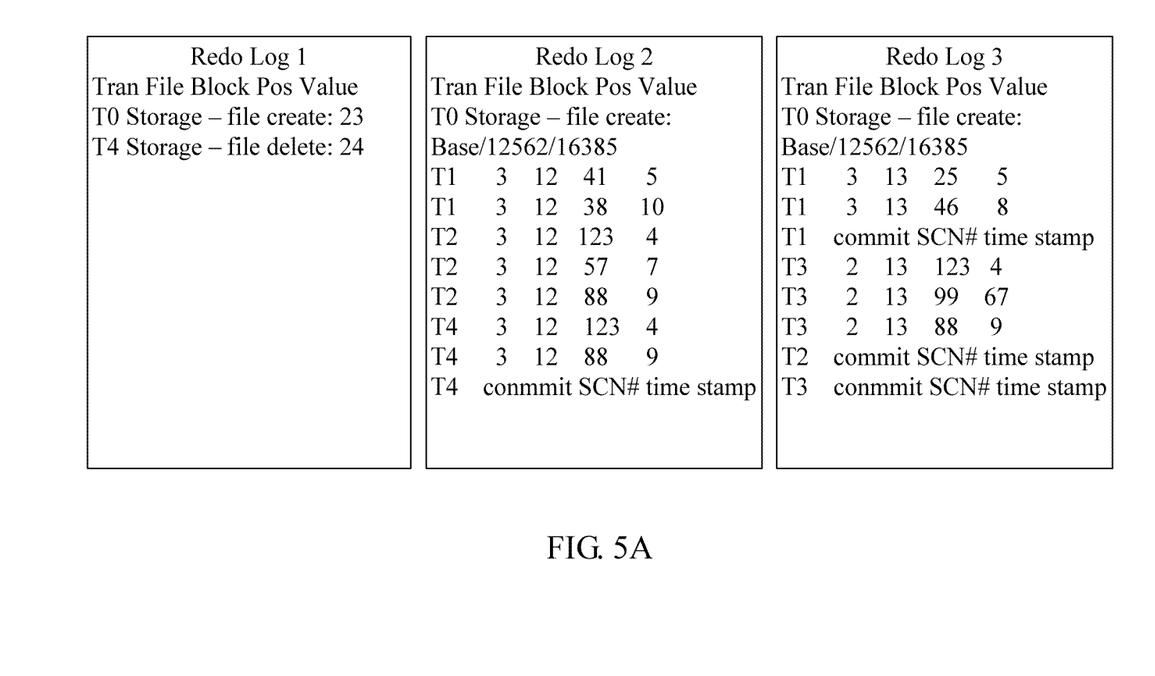
FIG. 5A to FIG. 5B are schematic diagrams of a log file and fault rectification according to an embodiment of the present invention.

FIG. 5A is a schematic diagram of three log files according to an embodiment. The following describes a process of the foregoing partition algorithm with reference to the figure. There are three log files: a Redo Log 1, a Redo Log 2, and a Redo Log 3. The Redo Log 1 is a preferential execution log file, and the Redo Log 2 and the Redo Log 3 are parallel execution log files. The Redo Log 1 includes a transaction of creating a file, a transaction of deleting a file, and the like. The Redo Log 2 and the Redo Log 3 include transactions such as modifying and submitting data. Content in the parallel execution log files includes information about a data page: a file number, a page number, and a position on the page, and the like. For example, a record in the Redo Log 2 is "T1 3 12 41 5", where T1 represents a transaction, in the transaction, a data page (3, 12, 41) is modified, and a value after the modification is 5. In information about the data page (3, 12, 41), 3 indicates a file number of a file in which modified data is located; 12 indicates a page number (also called a block number) of a page on which the modified data is located in the file; and 41 indicates a position at which the modified data is located on the page, and is generally the number of bytes. The foregoing example is that the $41^{th}$ byte on the $12^{th}$ page in the file 3 is the data to be modified, and a value of the modified data is 5. A hash value is obtained by means of calculating according to the file number 3, the page number 12, and the position 41 on the page, and searching is performed in a preset correspondence to obtain a log buffer number corresponding to the hash value, so as to complete partition of the transaction log. In this way, it can be learned that a data page can be uniquely determined using a file number together with a page number, and therefore, records belonging to a same data page are all stored in a same log buffer, and may be written into a same log file correspondingly. Information about a plurality of data pages may be stored in one parallel execution log file, but information about one data page cannot be stored in different log files in a splitting manner; and in this way, it can be ensured that restoration operations are performed in parallel according to the parallel execution log file when a fault of a database system is rectified.

Figure 5B:
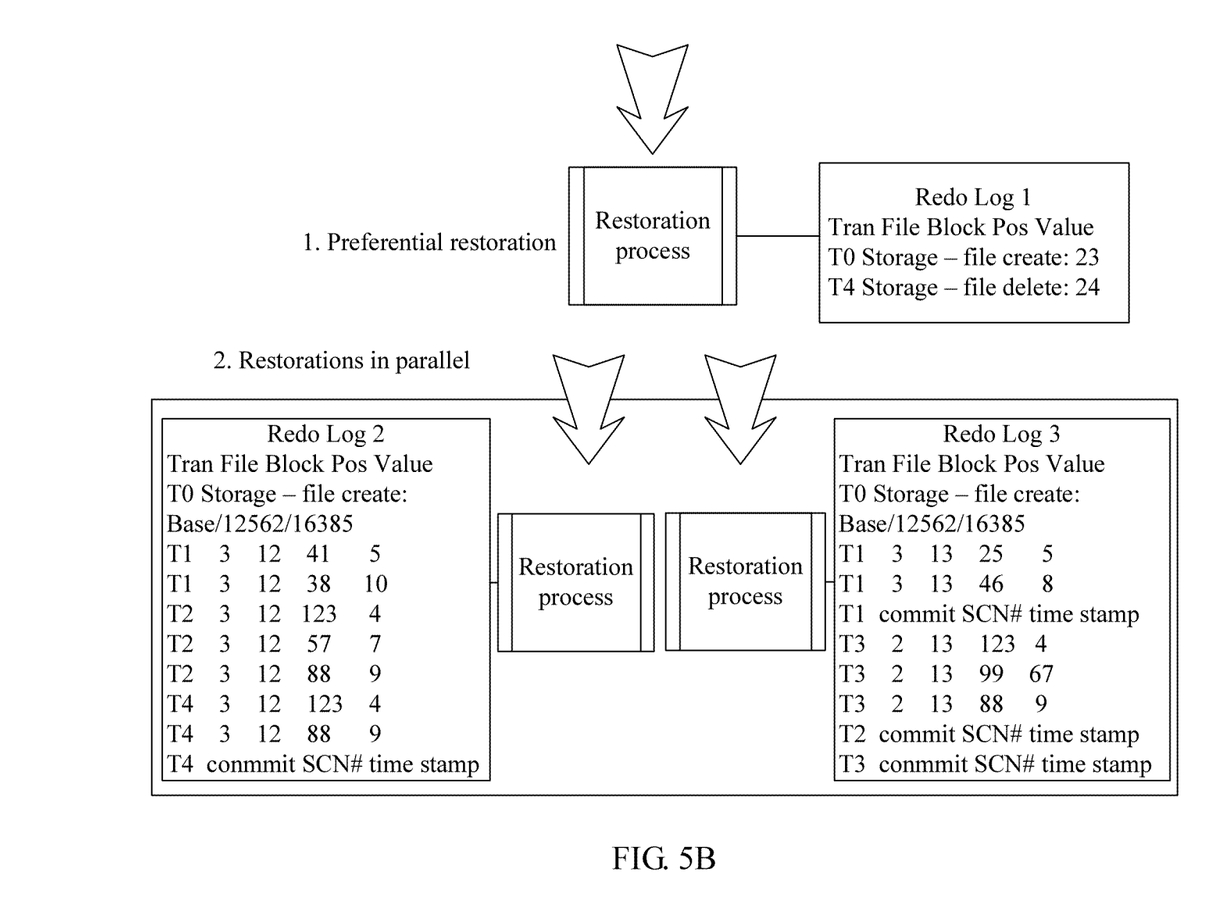

FIG. 5B is a schematic diagram of fault rectification according to a log file according to an embodiment. When a fault of a database system is rectified, a restoration operation is first performed according to a preferential execution log file, and generally, the log file is one file; therefore, one process or thread may be enabled for execution. Then restoration operations are performed in parallel according to a plurality of parallel execution log files, one process or thread may be enabled for each parallel execution log file, and the fault is rectified at the same time, which effectively and greatly improves efficiency of fault rectification of the system, and improves availability of the database system.

According to the foregoing method provided in this embodiment, an SQL request is received; a data page corresponding to the SQL request is modified according to the SQL request; a corresponding transaction log is generated for the modifying; the transaction log is partitioned to obtain a plurality of log segments; the plurality of log segments is written into a plurality of log buffers; and the log segments in the plurality of log buffers are written into a log file in parallel. In this way, it is implemented that the transaction log is recorded in parallel. There is a plurality of log buffers, and log segments are written into a log file in a parallel processing manner; therefore, parallel execution log buffers enable resources to be locked separately without affecting each other, so that lock granularities of the log buffers of the transaction log are reduced, a speed at which a log file is written into a magnetic disk is greatly increased, thereby improving performance of a database system and enhancing user experience. In addition, when a fault is rectified, a plurality of log file processes is used to perform restorations in parallel, which shortens restoration time and improves efficiency of fault rectification and availability of the database system.

Figure 6:
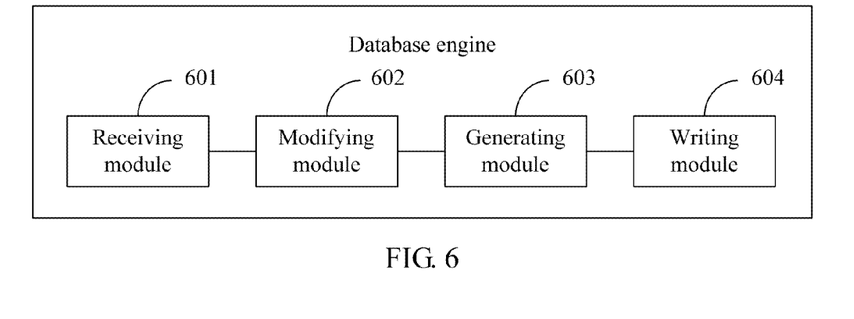
FIG. 6 is a structural diagram of a database engine according to an embodiment of the present invention.

Referring to FIG. 6, an embodiment of the present invention further provides a database engine, which is configured to record a transaction log and includes a receiving module 601 configured to receive a SQL request; a modifying module 602 configured to modify, according to the SQL request, a data page corresponding to the SQL request; a generating module 603 configured to generate a corresponding transaction log for the modifying; and a writing module 604 configured to partition the transaction log to obtain a plurality of log segments, write the plurality of log segments into a plurality of log buffers, and write the log segments in the plurality of log buffers into a log file in parallel.

In this embodiment, there may be one log file or may be a plurality of log files. Generally, there is a plurality of log files. When content in a plurality of log buffers is written into a plurality of log files, a relationship between the number of log buffers and the number of log files is not limited in this embodiment, which may be the same or may be different. One or more threads or processes may be enabled to perform log file writing, and the number of threads or processes is not limited in this embodiment. For details, reference is made to the description in the foregoing embodiment, which is not described herein again.

In this embodiment, the foregoing database engine may further include a determining module configured to determine a type of the transaction log; and the foregoing writing module 604 may include a log buffer writing unit configured to, if the determining module determines that the type of the transaction log is a parallel execution log, partition the transaction log to obtain the plurality of log segments, and write the plurality of log segments into a plurality of parallel execution log buffers; and a file writing unit configured to write the log segments in the plurality of log buffers into a plurality of parallel execution log files in parallel; where the parallel execution log refers to a transaction log that is generated when the modifying is modifying during which a sequence does not need to be ensured.

Further, the log buffer writing unit is further configured to, if the determining module determines that the type of the transaction log is a preferential execution log, write the transaction log into a preferential execution log buffer; and the file writing unit is further configured to write the transaction log in the preferential execution log buffer into a preferential execution log file; where the preferential execution log refers to a transaction log that is generated when the modifying is modifying during which a sequence needs to be ensured.

In this embodiment, the transaction log may be classified into two types: a preferential execution log and a parallel execution log. Generally, the preferential execution log may be stored using one file, that is, a preferential execution log file; while the parallel execution log may be stored using a plurality of files, that is, parallel execution log files. For details, reference is made to the description in the foregoing embodiment, which is not described herein again.

The foregoing determining module may be configured to determine, according to the transaction log, whether the modifying is modifying during which a sequence needs to be ensured; if the modifying is modifying during which a sequence needs to be ensured, determine that the type of the transaction log is a preferential execution log; and if the modifying is modifying during which a sequence does not need to be ensured, determine that the type of the transaction log is a parallel execution log.

The log buffer writing unit may include a determining subunit configured to determine, according to a file number, a page number, and a position on a page of each record in the transaction log and according to a preset rule, a parallel execution log buffer corresponding to each record; and a log buffer writing subunit configured to write each record into the corresponding log buffer in parallel; where the preset rule is that records related to a same data page correspond to a same parallel execution log buffer.

Further, the foregoing determining subunit may be configured to obtain a hash value of each record in the transaction log by means of calculating according to the file number, the page number, and the position on the page of each record in the transaction log, and perform searching, in a set correspondence between a hash value and a parallel execution log buffer, to obtain a parallel execution log buffer corresponding to the hash value of each record in the transaction log.

In this embodiment, each record corresponds to one data page, and information about the data page includes a file number, a page number, and a position on the page. The file number is used to identify a file in which modified data is located; the page number is used to identify a page on which the modified data is located in the file; and the position on the page is used to identify a position at which the modified data is located on the page, and is generally the number of bytes. In this embodiment, a page may also be called a block. Generally, data stored in a database is stored in the form of a table, and the table is formed by a data page. When the table in the database is read to a memory, the data page may also be called a block. Each data page has a unique number, and the number is a file number and a page number. A data page may be uniquely determined using a data page number, and a position at which data is stored can be found on a data page using a position on the page.

By performing partition using a hash algorithm, a modification log of a same data page can be saved in one log file, and a sequence requirement can be ensured when restorations are performed in parallel. When a process in which a plurality of data pages is restored in parallel is ensured, each data page can be restored according to a transaction modification sequence, so as to meet a sequence requirement of a database restoration.

In this embodiment, the foregoing database engine may further include a restoring module configured to, when a fault is rectified, first execute a restoration operation according to the preferential execution log file, and then execute restoration operations in parallel according to the plurality of parallel execution log files.

One thread or process may be first enabled, and a restoration operation is performed by reading the preferential execution log file; and then a plurality of threads or processes is enabled, all parallel execution log files are read at the same time, and restorations are performed in parallel. Records related to a same data page are all in a same log file, and therefore, a relation and a sequence between a plurality of parallel execution logs do not need to be considered when restorations are performed in parallel, thereby greatly increasing a speed and efficiency of restoring a database system.

Figure 7:
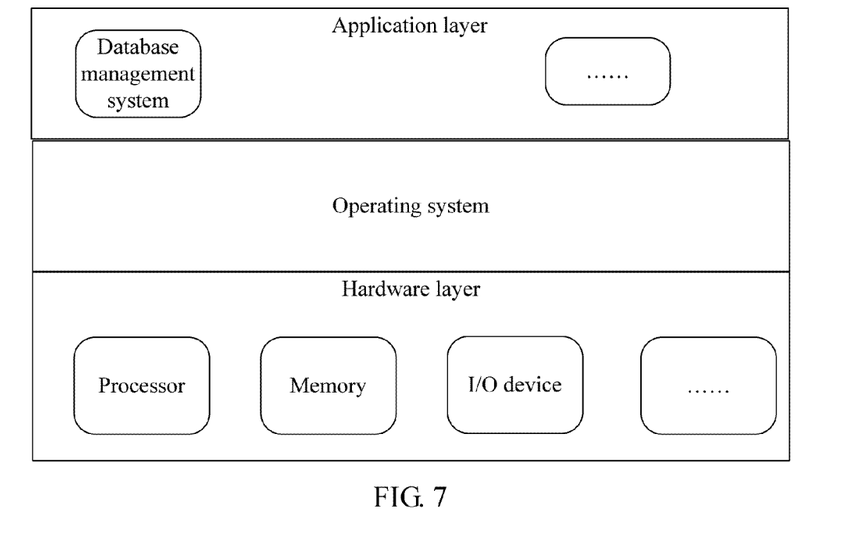
FIG. 7 is a structural diagram of another database engine according to an embodiment of the present invention.

It should be noted that FIG. 7 is used as an example to describe a logical structure of a database engine according to an embodiment of the present invention. As shown in FIG. 7, a hardware layer includes a processor such as a central processing unit (CPU), and certainly, may further include a memory, an input/output device, a network interface, and the like. An operating system kernel, such as a Linux Kernel or some drivers, is run at the hardware layer. In addition, the database engine further includes an application layer, where the application layer includes a database management system, and the like.

As shown in FIG. 7, a function of a receiving module 601 included in the database engine provided in this embodiment of the present invention may be implemented by the input/output (I/O) device at the hardware layer, and functions of a modifying module 602, a generating module 603 and a writing module 604 may be implemented by the processor.

It should be noted that, in an actual application, a product form of the database engine in this embodiment of the present invention may be a computing node, or a function module on a server, which is not limited in the present invention.

In addition, the foregoing database engine provided in this embodiment can execute the method provided in any one of the foregoing method embodiments, and for a detailed process, reference is made to the descriptions in the method embodiments, which is not described herein again.

According to the foregoing database engine provided in this embodiment, an SQL request is received; a data page corresponding to the SQL request is modified according to the SQL request; a corresponding transaction log is generated for the modifying; the transaction log is partitioned to obtain a plurality of log segments; the plurality of log segments is written into a plurality of log buffers; and the log segments in the plurality of log buffers are written into a log file in parallel. In this way, it is implemented that the transaction log is recorded in parallel. There is a plurality of log buffers, and log segments are written into a log file in a parallel processing manner; therefore, parallel execution log buffers enable resources to be locked separately without affecting each other, so that lock granularities of the log buffers of the transaction log are reduced, a speed at which a log file is written into a magnetic disk is greatly increased, thereby improving performance of a database system and enhancing user experience. In addition, when a fault is rectified, a plurality of log file processes is used to perform restorations in parallel, which shortens restoration time and improves efficiency of fault rectification and availability of the database system.

Figure 8:
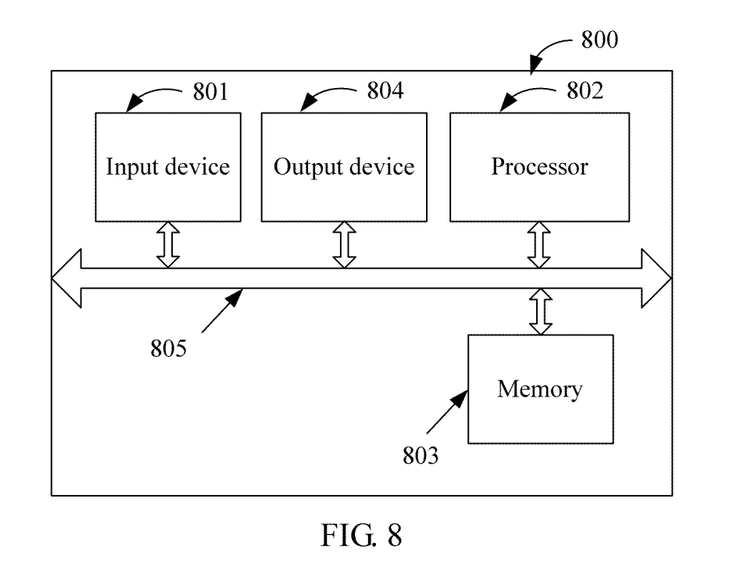
FIG. 8 is a structural diagram of still another database engine according to an embodiment of the present invention.

FIG. 8 is a schematic structural diagram of a database engine 800 according to an embodiment of the present invention. The database engine 800 may include an input device 801, an output device 804, a processor 802, and a memory 803.

The memory 803 may include a read-only memory and a random access memory, and provides an instruction and data for the processor 802. The memory 803 may further include a non-volatile random access memory (NVRAM).

The memory 803 stores the following elements: an executable module or a data structure, or subsets thereof, or extended sets thereof: operation instructions: including various operation instructions, which are used to implement various operations; and an operating system: including various system programs, which are used to implement various basic services and process hardware-based tasks.

In this embodiment of the present invention, by invoking the operation instructions stored in the memory 803 (the operation instructions may be stored in the operating system), the processor 802 executes the following operations: receiving a SQL request using the input device 801; modifying, according to the SQL request, a data page corresponding to the SQL request; generating a corresponding transaction log for the modifying; partitioning the transaction log to obtain a plurality of log segments; and writing the plurality of log segments into a plurality of log buffers, and writing the log segments in the plurality of log buffers into a log file in parallel.

In this embodiment, there may be one log file or may be a plurality of log files. Generally, there is a plurality of log files. When content in a plurality of log buffers is written into a plurality of log files, a relationship between the number of log buffers and the number of log files is not limited in this embodiment, which may be the same or may be different. One or more threads or processes may be enabled to perform log file writing, and the number of threads or processes is not limited in this embodiment. For details, reference is made to the description in the foregoing embodiment, which is not described herein again.

The processor 802 may also be called a CPU. The memory 803 may include a read-only memory and a random access memory, and provides an instruction and data for the processor 802. The memory 803 may further include a NVRAM. In a specific application, all components of the database engine 800 are coupled using a bus system 805, where in addition to a data bus, the bus system 805 may further include a power supply bus, a control bus, a status signal bus, and the like. For clarity, all buses are all marked as the bus system 805 in the figure.

The method disclosed in the foregoing embodiment of the present invention may be applied to the processor 802, or implemented by the processor 802. The processor 802 may be an integrated circuit chip that has a signal processing capability. In an implementation process, each step of the foregoing method may be completed using an integrated logic circuit in the form of hardware or an instruction in the form of software in the processor 802. The foregoing processor 802 may be a general purpose processor, a digital signal processor (DSP), an application-specific integrated circuit (ASIC), a field programmable gate array (FPGA) or another programmable logic device, a discrete gate or a transistor logic device, or a discrete hardware assembly, which can implement or execute each method, step or logical block diagram disclosed in this embodiment of the present invention. The general purpose processor may be a microprocessor, the processor may be any conventional processor, or the like. The steps of the method disclosed in the embodiment of the present invention may be executed and completed by a hardware decoding processor directly, or executed and completed by a combination of hardware and a software module in a decoding processor. The software module may be located in a storage medium that is mature in the art, such as a random access memory, a flash memory, a read-only memory, a programmable read-only memory, an electrically erasable programmable memory, or a register. The storage medium is located in the memory 803. The processor 802 reads information in the memory 803, and implements the steps of the foregoing method in combination with hardware thereof.

Optionally, the processor 802 may determine a type of the transaction log; if the type of the transaction log is a parallel execution log, partition the transaction log to obtain the plurality of log segments, and write the plurality of log segments into a plurality of parallel execution log buffers; and write content in the plurality of log buffers into a plurality of parallel execution log files in parallel; where the parallel execution log refers to a transaction log that is generated when the modifying is modifying during which a sequence does not need to be ensured.

In this embodiment, the transaction log may be classified into two types: a preferential execution log and a parallel execution log. Generally, the preferential execution log may be stored using one file, that is, a preferential execution log file; while the parallel execution log may be stored using a plurality of files, that is, parallel execution log files. For details, reference is made to the description in the foregoing embodiment, which is not described herein again.

Optionally, the processor 802 may further execute the following operations: if the type of the transaction log is a preferential execution log, writing the transaction log into a preferential execution log buffer; and writing the transaction log in the preferential execution log buffer into a preferential execution log file, where the preferential execution log refers to a transaction log when the modifying is modifying during which a sequence needs to be ensured.

Optionally, the processor 802 may determine, according to a file number, a page number, and a position on a page of each record in the transaction log and according to a preset rule, a parallel execution log buffer corresponding to each record; and write each record into the corresponding log buffer in parallel; where the preset rule is that records related to a same data page correspond to a same parallel execution log buffer. The processor 802 obtains a hash value of each record in the transaction log by means of calculating according to the file number, the page number, and the position on the page of each record in the transaction log, and performs searching, in a set correspondence between a hash value and a parallel execution log buffer, to obtain a parallel execution log buffer corresponding to the hash value of each record in the transaction log.

In this embodiment, each record corresponds to one data page, and information about the data page includes a file number, a page number, and a position on the page. The file number is used to identify a file in which modified data is located; the page number is used to identify a page on which the modified data is located in the file; and the position on the page is used to identify a position at which the modified data is located on the page, and is generally the number of bytes. In this embodiment, a page may also be called a block. Generally, data stored in a database is stored in the form of a table, and the table is formed by a data page. When the table in the database is read to a memory, the data page may also be called a block. Each data page has a unique number, and the number is a file number and a page number. A data page may be uniquely determined using a data page number, and a position at which data is stored can be found on a data page using a position on the page.

By performing partition using a hash algorithm, a modification log of a same data page can be saved in one log file, and a sequence requirement can be ensured when restorations are performed in parallel. When a process in which a plurality of data pages is restored in parallel is ensured, each data page can be restored according to a transaction modification sequence, so as to meet a sequence requirement of a database restoration.

In this embodiment, the foregoing processor 802 may further be configured to, when a fault is rectified, first execute a restoration operation according to the preferential execution log file, and then execute restoration operations in parallel according to the plurality of parallel execution log files.

One thread or process may be first enabled, and a restoration operation is performed by reading the preferential execution log file; and then a plurality of threads or processes is enabled, all parallel execution log files are read at the same time, and restorations are performed in parallel. Records related to a same data page are all in a same log file, and therefore, a relation and a sequence between a plurality of parallel execution logs do not need to be considered when restorations are performed in parallel, thereby greatly increasing a speed and efficiency of restoring a database system.

The foregoing database engine provided in this embodiment can execute the method provided in any one of the foregoing method embodiments, and for a detailed process, reference is made to the descriptions in the method embodiments, which is not described herein again.

According to the database engine 800 in this embodiment of the present invention, an SQL request is received; a data page corresponding to the SQL request is modified according to the SQL request; a corresponding transaction log is generated for the modifying; the transaction log is partitioned to obtain a plurality of log segments; the plurality of log segments is written into a plurality of log buffers; and the log segments in the plurality of log buffers are written into a log file in parallel. In this way, it is implemented that the transaction log is recorded in parallel. There is a plurality of log buffers, and log segments are written into a log file in a parallel processing manner; therefore, parallel execution log buffers enable resources to be locked separately without affecting each other, so that lock granularities of the log buffers of the transaction log are reduced, a speed at which a log file is written into a magnetic disk is greatly increased, thereby improving performance of a database system and enhancing user experience. In addition, when a fault is rectified, a plurality of log file processes is used to perform restorations in parallel, which shortens restoration time and improves efficiency of fault rectification and availability of the database system.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, an optical disc, or the like.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for recording a transaction log comprising:
receiving a structured query language (SQL) request;
modifying, according to the SQL request data page corresponding to the SQL request;
generating a corresponding transaction log for the modifying;
partitioning the transaction log to obtain a plurality of log segments; and
writing, in parallel, the plurality of log segments into a plurality of log buffers, and the log segments in the plurality of log buffers into a log file,
wherein partitioning the transaction log to obtain the plurality of log segments and writing, in parallel, the plurality of log segments into the plurality of log buffers, and the log segments in the plurality of log o file comprises:
determining a type of the transaction log,
partitioning the transaction log to obtain the plurality of log segments when the type of the transaction log is a parallel execution log;
writing the plurality of log segments into a plurality of parallel execution log buffers; and
writing the log segments in the plurality of log buffers into a plurality of parallel execution log files in parallel, wherein the parallel execution log refers to a transaction log that is generated when the modifying is modifying during which a sequence does not need to be ensured, and
wherein partitioning the transaction log to obtain the plurality of log segments and writing the plurality of log segments into a plurality of parallel execution log buffers comprises:
determining, according to a file number, a page number, and a position on a page of each record in the transaction log and according to a preset rule, a parallel execution log buffer corresponding to each record; and
writing each record into the corresponding log buffer in parallel, wherein the preset rule is that records related to a same data page correspond to a same parallel execution log buffer.

2. The method according to claim 1, wherein, after determining the type of the transaction log, the method further comprises:
writing the transaction log into a preferential execution log buffer when the type of the transaction log is a preferential execution log; and
writing the transaction log in the preferential execution log buffer into a preferential execution log file, wherein the preferential execution log refers to a transaction log that is generated when the modifying is modifying during which a sequence needs to be ensured.

3. The method according to claim 2 further comprising:
first executing a restoration operation according to the preferential execution log file when a fault is rectified; and
then executing restoration operations in parallel according to the plurality of parallel execution log files.

4. The method according to claim 1, wherein determining, according to the file number, the page number, and the position on a page of each record in the transaction log and according to the preset rule, the parallel execution log buffer corresponding to each record comprises:

obtaining a hash value of each record in the transaction log by means of calculating according to the file number, the page number, and the position on the page of each record in the transaction log; and     searching, in a set correspondence between a hash value and a parallel execution log buffer, to obtain a parallel execution log buffer corresponding to the hash value of each record in the transaction log.

5. The method according to claim 1, wherein determining the type of the transaction log comprises:

determining, according to the transaction log, whether the modifying is modifying during which a sequence needs to be ensured;

determining that the type of the transaction log is a preferential execution log when the modifying is modifying during which a sequence needs to be ensured; and     determining that the type of the transaction log is a parallel execution log when the modifying is modifying during which a sequence does not need to be ensured.

6. A database engine comprising:

a processor; and a computer readable storage medium storing computer executable instructions, wherein the processor is configured to execute the computer executable instructions to:

receive a structured query language (SQL) request;

modify, according to the SQL request, a data page corresponding to the SQL request;

generate a corresponding transaction log for the modifying;

determine a type of the transaction log;

determine, according to a file number, a page number, and a position on a page of each record in the transaction log and according to a preset rule, a parallel execution log buffer corresponding to each record; and     write each record into the corresponding log buffer in parallel, wherein the preset rule is that records related to a same data page correspond to a same parallel execution log buffer; and     write the log segments in the plurality of log buffers into a plurality of parallel execution log files in parallel, wherein the parallel execution log refers to a transaction log that is generated when the modifying is modifying during which a sequence does not need to be ensured.

7. The database engine according to claim 6, wherein the processor is further configured to:

write the transaction log into a preferential execution log when is determined that the type of the transaction log is a preferential execution log; and     write the transaction log in the preferential execution log buffer into a preferential execution log file, and     wherein the preferential execution log refers to a transaction log that is generated when the modifying is modifying during which a sequence needs to be ensured.

8. The database engine according to claim 7, wherein the processor is further configured to:

execute a restoration operation according to the preferential execution log file when a fault is rectified; and     then execute restoration operations in parallel according to the plurality of parallel execution log files.

9. The database engine according to claim 6, wherein the processor is further configured to:

obtain a hash value of each record in the transaction log by means of calculating according to the file number, the page number, and the position on the page of each record in the transaction log; and     search, in a set correspondence between a hash value and a parallel execution log buffer, to obtain a parallel execution log buffer corresponding to the hash value of each record in the transaction log.

10. The database engine according to claim 6, wherein the processor is further configured to:

determine, according to the transaction log, whether the modifying is modifying during which a sequence needs to be ensured;

determine that the type of the transaction log is a preferential execution log when the modifying is modifying during which a sequence needs to be ensured; and     determine that the type of the transaction log is a parallel execution log when the modifying is modifying during which a sequence does not need to be ensured.

\* \* \* \* \*

UNITED STATES PATENT AND TRADEMARK OFFICE
CERTIFICATE OF CORRECTION

PATENT NO.        : 9,189,487 B2                                    Page 1 of 1
APPLICATION NO.   : 14/721600
DATED             : November 17, 2015
INVENTOR(S)       : Wei Yu et al.

It is certified that error appears in the above-identified patent and that said Letters Patent is hereby corrected as shown below:

IN THE CLAIMS

Column 16, Claim 1, Line 25 should read:

A method for recording a transaction log comprising:
receiving a structured query language (SQL) request;
modifying, according to the SQL request, a data page corresponding to the SQL request;
generating a corresponding transaction log for the modifying;
partitioning the transaction log to obtain a plurality of log segments; and
writing, in parallel, the plurality of log segments into a plurality of log buffers, and the log segments in the plurality of log buffers into a log file,
wherein partitioning the transaction log to obtain the plurality of log segments and writing, in parallel, the plurality of log segments into the plurality of log buffers, and the log segments in the plurality of log buffers into the log file comprises:
determining a type of the transaction log;
partitioning the transaction log to obtain the plurality of log segments when the type of the transaction log is a parallel execution log;
writing the plurality of log segments into a plurality of parallel execution log buffers; and
writing the log segments in the plurality of log buffers into a plurality of parallel execution log files in parallel,
wherein the parallel execution log refers to a transaction log that is generated when the modifying is modifying during which a sequence does not need to be ensured, and
wherein partitioning the transaction log to obtain the plurality of log segments and writing the plurality of log segments into a plurality of parallel execution log buffers comprises:
determining, according to a file number, a page number, and a position on a page of each record in the transaction log and according to a preset rule, a parallel execution log buffer corresponding to each record; and
writing each record into the corresponding log buffer in parallel, wherein the preset rule is that records related to a same data page correspond to a same parallel execution log buffer.

Signed and Sealed this
Fifth Day of April, 2016

Michelle K. Lee
*Director of the United States Patent and Trademark Office*